W. P. ANTHONY.
MOWING MACHINE.
APPLICATION FILED NOV. 7, 1910.

1,022,292.

Patented Apr. 2, 1912
4 SHEETS—SHEET 2

Witnesses
J. Joseph Bishop
C. S. Brown

Inventor
W. P. Anthony
By Foster Freeman Boulson & Hunt
Attorneys

W. P. ANTHONY.
MOWING MACHINE.
APPLICATION FILED NOV. 7, 1910.

1,022,292.

Patented Apr. 2, 1912.

4 SHEETS—SHEET 3.

W. P. ANTHONY.
MOWING MACHINE.
APPLICATION FILED NOV. 7, 1910.

1,022,292.

Patented Apr. 2, 1912.
4 SHEETS—SHEET 4.

Witnesses
J. Adolph Bishop
C. S. Brown.

Inventor
W. P. Anthony
By Foster Freeman
Attorneys

UNITED STATES PATENT OFFICE.

WENDELL P. ANTHONY, OF EDDYSTONE, PENNSYLVANIA, ASSIGNOR TO WM. SIMPSON & SONS, OF PHILADELPHIA, PENNSYLVANIA, A FIRM.

MOWING-MACHINE.

1,022,292.  Specification of Letters Patent.  Patented Apr. 2, 1912.

Application filed November 7, 1910. Serial No. 591,170.

*To all whom it may concern:*

Be it known that I, WENDELL P. ANTHONY, a citizen of the United States, and resident of Eddystone, in the county of Delaware and State of Pennsylvania, have invented certain new and useful Improvements in Mowing-Machines, of which the following is a specification.

The present invention is an improvement in power operated mowing machines and more particularly relates to the class of mowing machines which are used for mowing lawns, parks, golf courses, and other tracts on which it is desired to keep the surface of the ground smooth and the grass trimmed short and evenly. The present invention involves a plurality of cutters which are freely movable relatively in a vertical direction so that they may adapt themselves to the inequalities in the ground, one or more lawn rolling rollers and a suitable motor for driving the mechanism, together with steering mechanism for directing the course of the machine.

The invention will be described in connection with the accompanying drawings, in which,—

Figure 1:
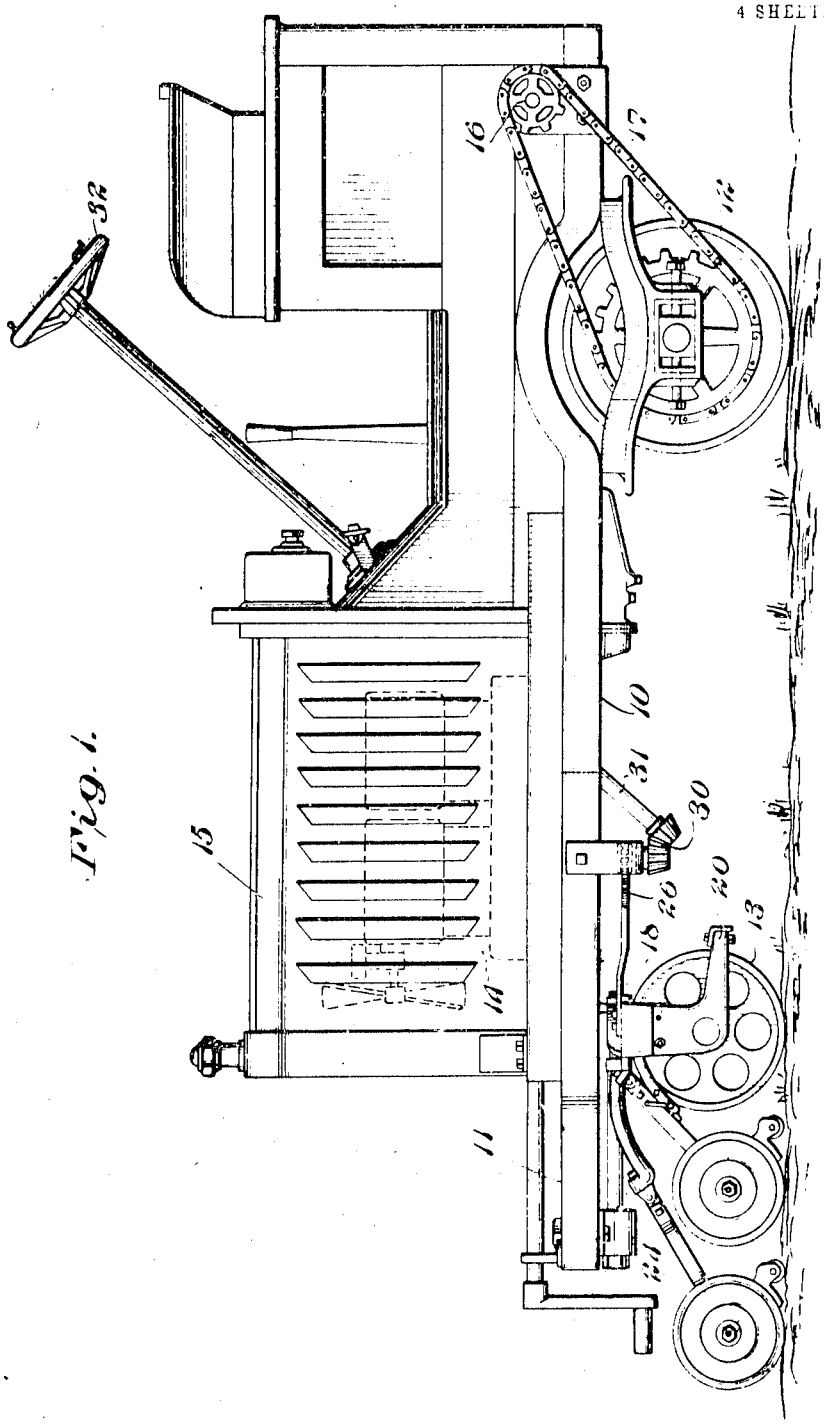
Figure 2:
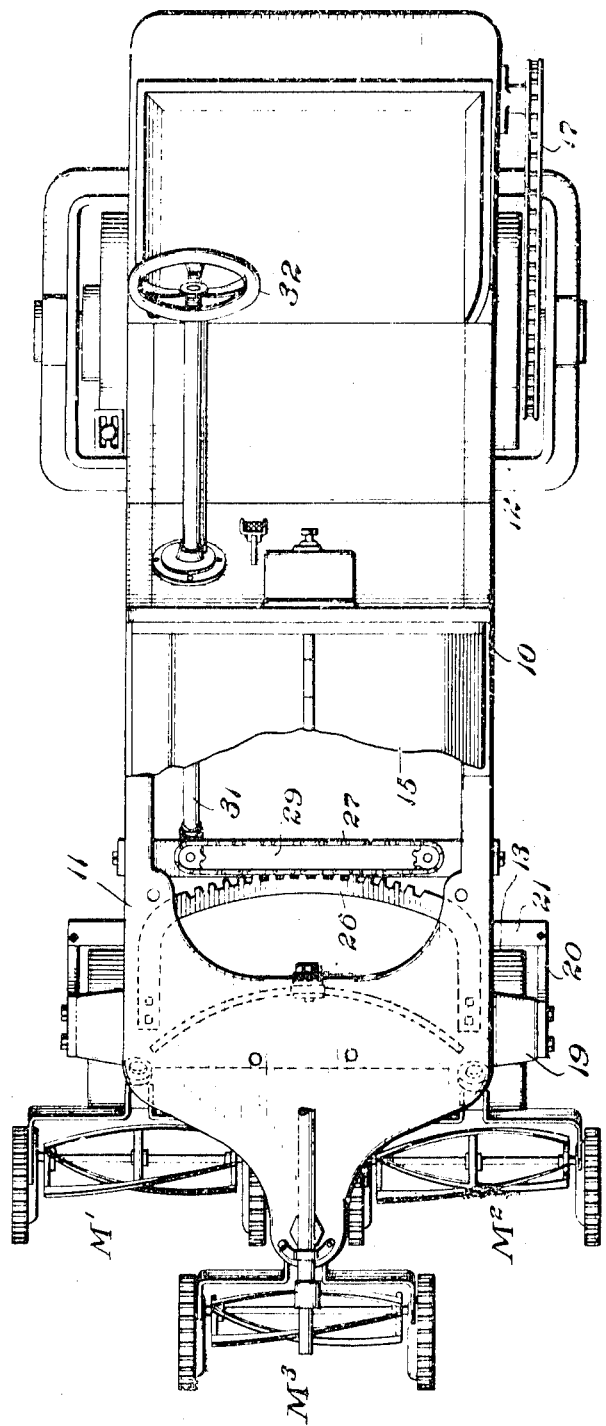
Figure 3:
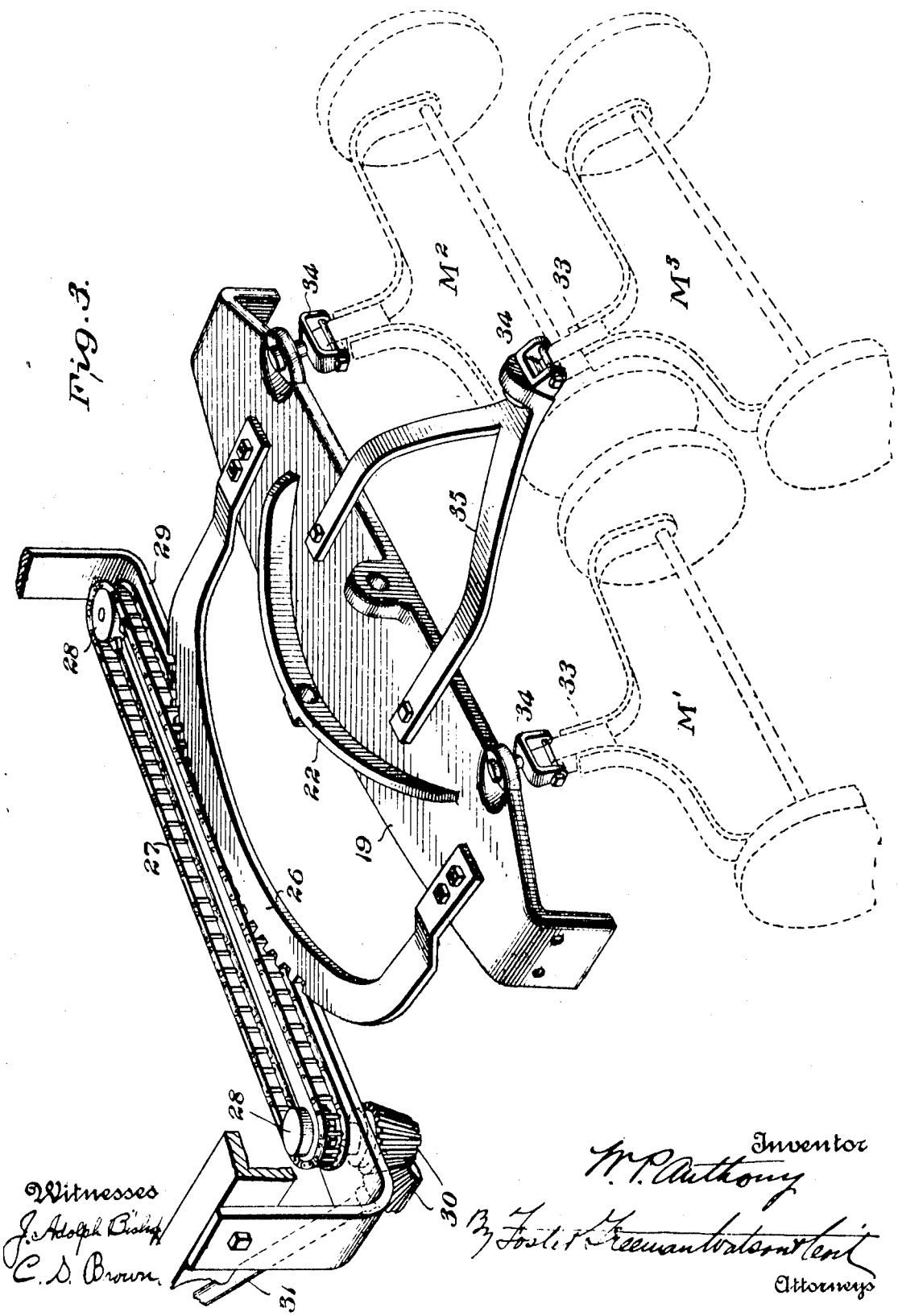
Figure 4:
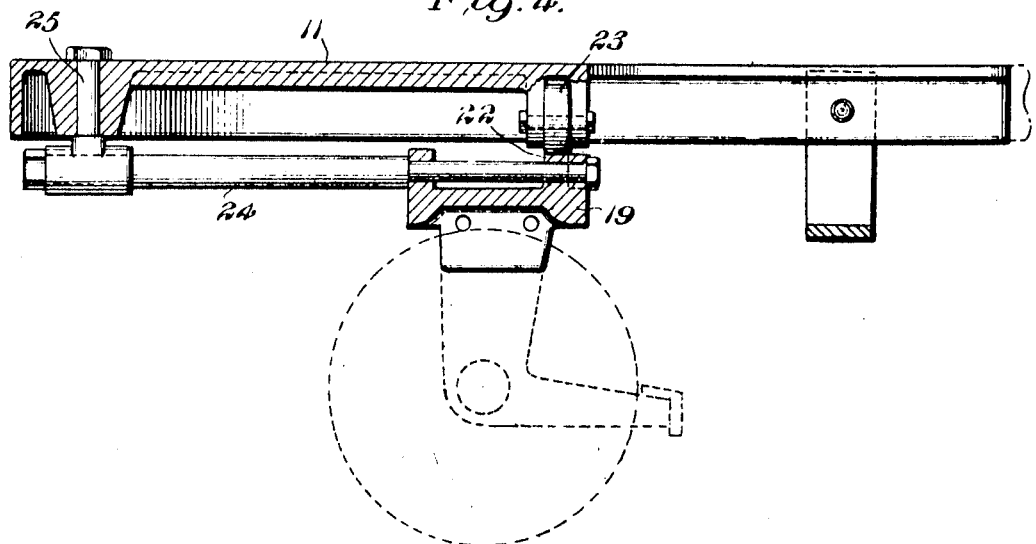
Figure 5:
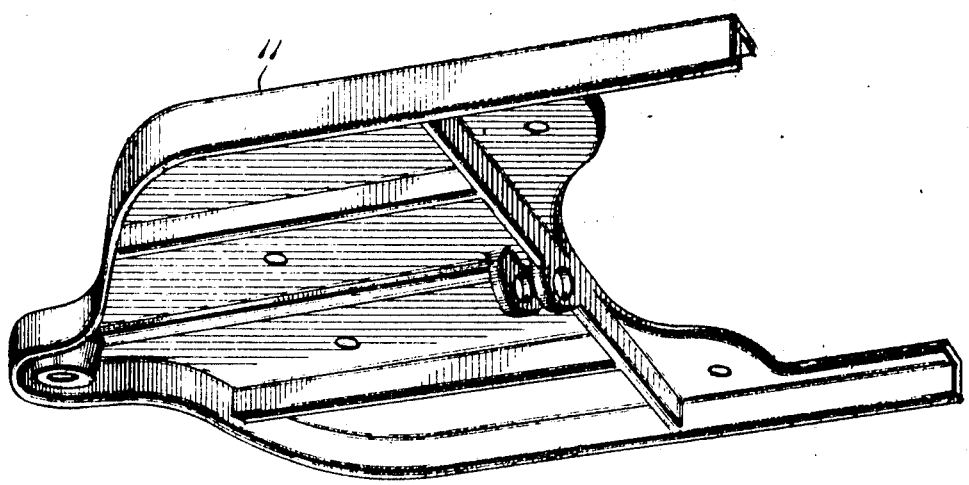

Figure 1 is a side elevation of a complete machine embodying the invention; Fig. 2 is a plan view of the same partly broken away; Fig. 3 is a perspective view illustrating particularly the steering mechanism, and the means of adjustably connecting the individual mowers with the front truck of the machine; Fig. 4 is a central longitudinal section through the front truck and the forward part of the frame; Fig. 5 is a perspective view showing the underside of the forward part of the frame to which the front truck is pivoted.

Referring to the drawing, 10 indicates the main frame of the machine, which is somewhat similar to an automobile frame, excepting that the forward part is in the form of a cast plate 11 of suitable conformation for attachment to the frame 10 and for coöperating with the front roller and the cutters and steering mechanism, as will be hereinafter described. The frame is supported on a rear roller 12 and a forward roller 13, both of which are lawn-rolling rollers adapted to improve the surface of the ground over which the machine is operated. The rear roller is also a driving wheel or roller, being driven by suitable intermediate mechanism from a motor 14 contained within a casing 15. Any suitable motor may be used and any suitable mechanical connections between the motor and the driving roller. I have used in actual practice a gasolene engine with the usual cooling and ignition system, change gears and driven shaft similar to the power plant of an automobile and have illustrated the same diagrammatically in the accompanying drawings. A transverse shaft 16, driven by the engine 14 is shown as connected to the driving roller 12 by a sprocket chain 17 and suitable sprocket wheels. The movement of the shaft 16 and driving roller may be reversed to drive the machine backward in the same manner as in an automobile.

The forward roller 13 is pivotally mounted in legs 18 extending downwardly from the ends of the beam 19 and provided with rearward extensions 20 which carry a scraper 21 in proximity to the surface of the roller. The beam 19 and its connected parts may be termed the front truck of the machine. As shown in Fig. 3 the truck carries a segmental rail 22, and, as shown in Figs. 2 and 4, the front frame 11 is supported on the front truck by means of a roller 23 pivoted between lugs on the front frame and running on the rail 22.

The front truck is pivotally connected to the front frame by means of a bar 24 (Fig. 4) which is horizontally arranged beneath the front frame, and has its forward end pivotally connected to the frame by means of a bolt or pivot pin 25. The rear end of the bar 24 is rigidly connected to the truck in some suitable manner. As shown in Fig. 4 the bar is securely connected to lugs projecting upward from the upper face of the beam 19. The segmental rail 22 is concentric with the pivot 25 and hence as the front truck swings on the pivot the roller 23 runs on the rail and supports the frame. It will be noted that the rail is arranged directly over the front roller and hence the weight of the forward part of the machine is transmitted quite directly through the truck frame and roller to the ground. The front frame 11 is preferably a casting of suitable conformation and the beam 19 of the truck is also preferably a casting.

In the rear of the truck and rigidly connected to the beam 19, as shown in Figs. 2 and 3, is a segmental rack or gear 26 which is concentric with the rail 22 and the pivot 25. The rack 26 is in mesh with a sprocket chain 27 carried by sprocket wheels 28 mounted on a transverse bar 29 carried by the frame. One of the wheels 28 is an idler and the other is connected by bevel gears 30 with a steering shaft 31 which is operated by a steering wheel 32 similar to those commonly used in steering automobiles. It will be seen that by turning the wheel 32 one way or the other the front truck may be turned about its pivot 25. It is found that when the machine is moving forward steering is effected with very little effort or strain upon the mechanism.

The mowing mechanism comprises a plurality of small machines each of which may be constructed exactly as the hand operated mowing machines are constructed. In fact I have constructed my improved mowing machine so that small hand machines, such as are to be had in hardware stores, may be used for the cutting mechanism. This involves a number of advantages. It permits of selecting any one of a number of different types of machines which are available, and it reduces the cost of repairs to a minimum. It will be evident that the cost of repairing a large, specially constructed mowing machine might be considerable, while repair parts of small machines are usually carried by hardware dealers and are inexpensive. Furthermore, the cutters of the small machines are less liable to damage than the cutters of a large mower, in case of striking stones or other obstacles, on account of their lesser momentum.

In the drawing I have illustrated three cutting mechanisms M′, M², and M³, each comprising ground wheels, rotating cutters, and intermediate gearing, for driving the cutters from the ground wheels. The details of these mechanisms are so well known as not to require description herein. The two rear cutting mechanisms M′, M² have their beams or handle bars 33 connected by horizontal pivots to yokes 34 which are swiveled to the forward part of the beam 19 of the front truck. The horizontal pivots permit the cutting mechanisms to move up and down bodily and the swivels permit them to rock, thus permitting the ground wheels of the cutting mechanisms to follow all inequalities of the surface of the ground, which results in cutting the grass to an even length. The front cutting mechanism is likewise pivoted to a yoke 34 which is swiveled to a bracket 35 extending forward from the beam 19 sufficiently to keep the front cutting mechanism in advance of the rear cutting mechanisms. The cutting mechanism M³ is arranged centrally and is adapted to cut the grass between the swaths cut by the rear cutting mechanisms. The number of cutting mechanisms may be varied according to the class of work to be done. For light cutting of smooth ground an even greater number of cutters than illustrated may be used while for heavy work or work on rougher ground one of the side cutters, for instance, might be omitted.

I have not described the rear truck carrying the driving roller 12 in detail, as any suitable truck structure may be used for this purpose. It will also be understood that any suitable engine and intermediate gearing may be used for driving the rear roller. It will also be evident that the cutting mechanisms may be quickly disconnected by removing the pivot pins which connect the beams 33 to the machine, or otherwise, in which case the machine will be adapted for use as an ordinary power roller.

Having described my invention what I claim and desire to secure by Letters-Patent is, 1. In a lawn mower, the combination with a main frame and supporting wheels therefor, of a plurality of cutting mechanisms each comprising ground wheels and a rotating cutter, each of said cutting mechanisms being connected to the main frame by a universal joint, whereby it is permitted to adapt itself to the surface of the lawn.

2. In a lawn mower, the combination with a main frame and supporting wheels therefor, of three cutting mechanisms, each of said mechanisms comprising ground wheels and a rotary cutter, and each cutting mechanism being connected to the main frame by a universal joint, two of said cutting mechanisms being arranged respectively at opposite sides of the main frame, and the third cutting mechanism being arranged centrally and adapted to cut a swath between the swaths cut by the side cutting mechanisms.

3. A power operated mowing machine comprising a main frame, a motor, a rear truck provided with a wheel driven by the motor, a forward truck swiveled to the main frame, means for turning the forward truck to steer the machine, and a plurality of cutting mechanisms connected to the forward truck by universal joints, for the purpose set forth.

4. A power operated mowing machine comprising a main frame, a motor, a rear truck provided with a wheel driven by the motor, a forward truck swiveled to the main frame, means for turning the forward truck to steer the machine, and a plurality of independent cutting mechanisms detachably connected to the forward truck and having universal movement relative thereto.

5. A power operated mowing machine comprising a main frame, a motor, a rear truck provided with a wheel driven by the motor, a forward truck swiveled to the main frame, means for turning the forward truck to steer the machine, and three independent cutting mechanisms connected to the front truck by universal joints, one of said mechanisms being arranged in advance of the other two and adapted to cut a swath between the swaths cut by the other two.

6. A power operated mowing machine comprising a main frame, a motor, a rear truck provided with a lawn-rolling roller, connections for driving said roller from the motor, a forward truck provided with a lawn-rolling roller and with cutting mechanisms in advance of said roller, an arm extending forward from the forward truck and having its forward end connected to the main frame by a swivel joint, and means for turning the front truck about said joint to steer the machine.

7. A power operated mowing machine comprising a main frame, a motor, a rear truck provided with a lawn-rolling roller, connections for driving said roller from the motor, a forward truck provided with a lawn-rolling roller, a plurality of cutting mechanisms connected to said forward truck by universal joints and arranged to travel in advance of said forward truck, a pivotal connection between said forward truck and the main frame, and means on the main frame for turning the truck about said connection to steer the machine.

8. A power operated mowing machine comprising a main frame, a motor, a rear truck provided with a lawn-rolling roller, connections for driving said roller from the motor, a forward truck having a wheeled support, a plurality of cutting mechanisms arranged in advance of said support and independently connected to the truck, a pivot connecting said truck with the main frame, a segmental rack connected with the truck and arranged concentrically with the pivot, and steering mechanism comprising an endless chain engaging said rack for turning the truck.

9. A power operated mowing machine comprising a main frame, a motor, a rear truck provided with a lawn-rolling roller, connections for driving said roller from the motor, a forward truck having a lawn-rolling roller mounted therein and a segmental rail thereon, a roller mounted in the main frame and resting on said segmental rail, said rail being arranged substantially over the lawn-rolling roller of the forward truck, a pivot concentric with said rail and connecting the forward truck with the main frame, and a plurality of independent cutting mechanisms arranged in advance of the forward truck and connected thereto by universal joints.

In testimony whereof I affix my signature in presence of two witnesses.

WENDELL P. ANTHONY.

Witnesses:
CHAS. C. JÖRGENSEN,
CHAS. W. CONKLIN.